(12) United States Patent
Nishimura et al.

(10) Patent No.: US 9,423,286 B2
(45) Date of Patent: Aug. 23, 2016

(54) LIQUID LEVEL SENSING APPARATUS AND METHOD

(71) Applicant: KABUSHIKI KAISHA TOSHIBA, Minato-Ku (JP)

(72) Inventors: Kentaro Nishimura, Setagaya-Ku (JP); Katsumoto Nagase, Hachioji (JP); Fujio Shiraishi, Yokohama (JP); Yuka Takada, Minato-Ku (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 182 days.

(21) Appl. No.: 14/374,272

(22) PCT Filed: Jan. 25, 2013

(86) PCT No.: PCT/JP2013/051560
§ 371 (c)(1),
(2) Date: Jul. 24, 2014

(87) PCT Pub. No.: WO2013/111847
PCT Pub. Date: Jan. 8, 2013

(65) Prior Publication Data
US 2015/0040660 A1    Feb. 12, 2015

(30) Foreign Application Priority Data

Jan. 26, 2012 (JP) ................ 2012-014554

(51) Int. Cl.
*G01F 23/24* (2006.01)
*G01F 23/22* (2006.01)
(Continued)

(52) U.S. Cl.
CPC .............. *G01F 23/22* (2013.01); *G01F 23/241* (2013.01); *G01F 23/243* (2013.01); *G01F 23/248* (2013.01); *G21C 17/035* (2013.01); *G21C 19/07* (2013.01)

(58) Field of Classification Search
CPC ..... G01F 23/247; G01F 23/246; G01F 23/22; G01F 23/243; G01F 1/007; G01F 1/6888; G01F 23/00
See application file for complete search history.

(56) References Cited

U.S. PATENT DOCUMENTS 3,280,627 A * 10/1966 Cousins ................ G01F 23/246
73/295
3,905,243 A * 9/1975 Goldfuss ............... G01F 23/247
340/620

(Continued)

FOREIGN PATENT DOCUMENTS

JP       56-114718    9/1981
JP       59-107213    6/1984

(Continued)

OTHER PUBLICATIONS

International Preliminary Report on Patentability issued Aug. 7, 2014 in PCT/JP2013/051560 (with English translation).

(Continued)

*Primary Examiner* — David A Rogers
(74) *Attorney, Agent, or Firm* — Oblon, McClelland, Maier & Neustadt, L.L.P.

(57) ABSTRACT

Provided is a apparatus for sensing a liquid level reliably based solely on an analog process even if a liquid held in a container boils, causing the liquid level to fall. A liquid level sensing apparatus includes: a probe selection unit configured to select a probe whose heater is to be activated from among the plurality of probes; an input unit configured to receive an output of the temperature sensor of the probe selected by the probe selection unit, the output being received as a temperature signal directly in the form of an analog quantity; a signal processing unit configured to output a processing signal of the temperature signal in synchronization with activation of the heater; a calculation unit configured to arithmetically process the temperature signal and the processing signal and output a result; a gas/liquid discrimination unit configured to discriminate whether the detecting point exists in a gas phase or a liquid phase based on the output result of the arithmetic processing; and a display unit configured to indicate a discrimination result produced by the gas/liquid discrimination unit.

3 Claims, 6 Drawing Sheets

(51) Int. Cl.
*G21C 17/035* (2006.01)
*G21C 19/07* (2006.01)

(56) References Cited

U.S. PATENT DOCUMENTS

| | | | | |
|---|---|---|---|---|
| 4,016,758 A * | 4/1977 | Taylor | ................... | G01F 1/684 73/204.22 |
| 4,356,480 A * | 10/1982 | Dressler | ................ | G01F 23/243 340/450 |
| 4,367,462 A * | 1/1983 | Dressler | ................ | G01F 23/243 340/450 |
| 4,423,629 A * | 1/1984 | Ara | ....................... | G01F 23/248 374/54 |
| 4,609,913 A * | 9/1986 | Arbogast | ............. | G01F 23/246 323/366 |
| 4,633,491 A * | 12/1986 | Kuhnel | ................. | G01F 23/246 340/620 |
| 4,640,127 A * | 2/1987 | Schneider | ............. | G01F 23/246 219/492 |
| 4,929,930 A * | 5/1990 | Rezabek | ................. | G01F 23/22 340/589 |
| 5,111,692 A * | 5/1992 | McQueen | ............. | G01F 1/6986 73/204.17 |
| 5,209,115 A * | 5/1993 | Bond | ..................... | B64G 1/402 219/438 |
| 5,211,904 A * | 5/1993 | Oosterkamp | ........ | G21C 17/035 141/95 |
| 5,730,026 A * | 3/1998 | Maatuk | ................. | B64D 15/20 73/295 |
| 5,782,131 A * | 7/1998 | Lord | ....................... | F25B 39/02 374/54 |
| 6,536,276 B2 * | 3/2003 | Huss | ..................... | G01F 23/247 73/295 |
| 6,615,658 B2 * | 9/2003 | Snelling | ................ | G01F 23/248 340/622 |
| 6,973,828 B2 * | 12/2005 | Zimmermann | ........ | G01F 23/246 340/622 |
| 7,334,471 B2 * | 2/2008 | Maatuk | ................. | G01F 23/246 73/304 R |
| 7,828,960 B1 * | 11/2010 | Batten | ................ | B01D 17/0208 210/138 |
| 2002/0116998 A1 * | 8/2002 | Huss | ..................... | G01F 23/247 73/295 |
| 2003/0046997 A1 * | 3/2003 | Waller | .................. | F25B 31/002 73/295 |
| 2007/0113646 A1 * | 5/2007 | Maatuk | ................. | G01F 23/246 73/295 |
| 2010/0294021 A1 * | 11/2010 | Makino | .................. | G01N 25/18 73/25.03 |
| 2014/0109667 A1 * | 4/2014 | White | ................. | A47J 31/4457 73/304 C |
| 2014/0137645 A1 * | 5/2014 | Villella | .................... | G01F 23/22 73/295 |

FOREIGN PATENT DOCUMENTS

| | | |
|---|---|---|
| JP | 1-140134 U | 9/1989 |
| JP | 2005-134230 | 5/2005 |
| JP | 2013-7721 | 1/2013 |

OTHER PUBLICATIONS

Written Opinion issued Apr. 2, 2013 in PCT/JP2013/051560 (English translation only).
International Search Report issued Apr. 2, 2013, in PCT/JP2013/051560, filed Jan. 25, 2013.

* cited by examiner

… (1)

LIQUID LEVEL SENSING APPARATUS AND METHOD

TECHNICAL FIELD

The present invention relates to a technique for sensing a liquid level of a liquid held in a container.

BACKGROUND ART

In a spent fuel storage pool, to ensure a radiation shielding effect of water, a liquid level is kept under surveillance so as not to fall below a reference level, e.g., a level a little over twice a length of spent fuel assemblies.

The liquid level in a conventional spent fuel storage pool is measured by a float level switch installed in an upper end portion of the pool. Also, water temperature of the pool is measured by a thermometer installed separately from the float level switch.

Cranes for use to replace fuel are placed above the spent fuel storage pool and configured to move over an entire surface of the pool, severely limiting space for installation of liquid level meters and thermometers. Also from the perspective of preventing pool water leakage, through-holes cannot be formed in a pool wall surface, making it impossible to adopt a typical differential pressure system as a liquid level meter. Furthermore, if foreign objects drop in the fuel storage pool, it is difficult to take them out, and thus it is also necessary to take measures to prevent foreign objects from getting into the pool.

Under these circumstances, a sensor has been proposed which involves placing a heater in a neighborhood of one of two junctions of a thermocouple to sense a liquid level (e.g., Patent Document 1). Relying on the fact that there is a difference in thermal diffusivity between a water phase and gas phase, this technique determines in which of the water phase and gas phase a sensor portion is located, based on a temperature difference (electromotive force difference) between the two junctions.

PRIOR ART DOCUMENTS

Patent Documents

Patent Document 1: Japanese Patent Laid-Open No. 10-153681

SUMMARY OF THE INVENTION

Problems to be Solved by the Invention

Now, in the spent fuel storage pool, if a cooling function stops for a long period of time, disabling water supply, water temperature rises due to heat dissipation of the spent fuel, and the liquid level falls due to evaporation. If the liquid level falls in this way, the radiation shielding effect decreases, resulting in a deteriorated radiation environment. Thus, when the liquid level falls below a predetermined reference level, it is required to evaluate safety of the radiation environment by accurately keeping track of the liquid level.

However, with the technique described in Patent Document 1, when the water temperature rises to boiling temperature, it is difficult to measure the temperature difference (electromotive force difference) between the two junctions of the thermocouple in a stable manner. Consequently, there is concern that sensing accuracy for the liquid level in the spent fuel storage pool may decrease.

Also, since output signals of various sensors are processed digitally, meaning that the system is software-controlled, there is concern about vulnerability of nuclear facilities to contingencies.

The present invention has been made in view of the above circumstances and has an object to provide a technique for sensing a liquid level reliably based solely on an analog process even if a liquid held in a container boils, causing the liquid level to fall.

Means for Solving the Problems

A liquid level sensing apparatus which measures a liquid level in a liquid holding vessel based on temperature signals from a plurality of probes placed at fixed intervals in a vertical direction of the liquid holding vessel, where each of the probes contains a temperature sensor and a heater enclosed in the probe and the heater is placed in a neighborhood of a detecting point of the temperature sensor, the liquid level sensing apparatus includes: a probe selection unit configured to select a probe whose heater is to be activated from among the plurality of probes; an input unit configured to receive an output of the temperature sensor of the probe selected by the probe selection unit, the output being received as a temperature signal directly in the form of an analog quantity; a signal processing unit configured to output a processing signal of the temperature signal in synchronization with activation of the heater; a calculation unit configured to arithmetically process the temperature signal and the processing signal and output a result; a gas/liquid discrimination unit configured to discriminate whether the detecting point exists in a gas phase or a liquid phase based on the output result of the arithmetic processing; and a display unit configured to indicate a discrimination result produced by the gas/liquid discrimination unit.

Advantages of the Invention

The present invention provides a technique for sensing a liquid level reliably based solely on an analog process even if the liquid held in a container boils, causing the liquid level to fall.

DESCRIPTION OF EMBODIMENTS

First Embodiment

Embodiments of the present invention will be described below with reference to the accompanying drawings.

Figure 1A:
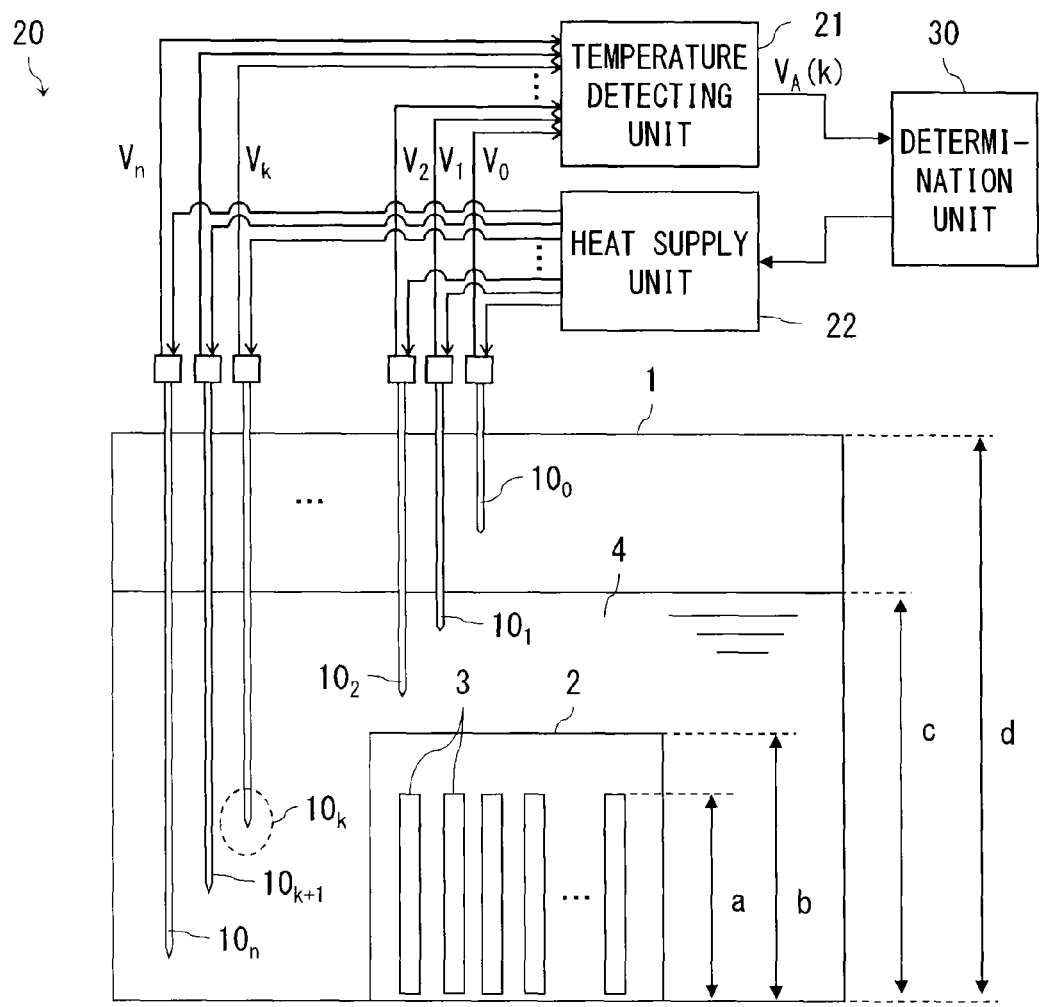
FIG. 1A is a conceptual diagram showing a spent fuel storage pool to which a liquid level sensing apparatus according to an embodiment of the present invention is applied and FIG. 1B is a sectional view of a tip portion of a temperature sensor.

FIG. 1A shows a spent fuel storage pool 1 to which a liquid level sensing apparatus 20 according to the embodiments is applied.

A rack 2 adapted to store plural spent fuel assemblies 3 is placed in a spent fuel storage pool 1 (hereinafter also referred to as a "liquid holding vessel 1"). Furthermore, a circulation cooler (not shown) is placed in the spent fuel storage pool 1 to cool pool water 4 whose temperature is raised by decay heat of the spent fuel assemblies 3.

If, for example, length a of the spent fuel assemblies 3 is approximately 4.5 m (a=approximately 4.5 m) and height b of the rack 2 is approximately 5 m (b=approximately 5 m), a liquid holding vessel 1 with a depth of about 12 m is required (d=approximately 12 m) and a liquid level of the pool water 4 is kept at a normal water level c=approximately 11 m.

Consequently, a high-level of radiation released from the spent fuel assemblies 3 is blocked by the pool water 4 and kept from leaking out of the liquid holding vessel 1.

In the liquid holding vessel 1, plural probes $10_k$ (k=0 to n) are placed with their tip portions spaced from one another in a height direction.

Figure 1B:
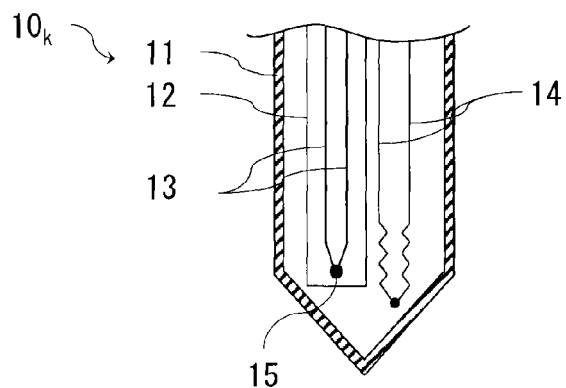

As shown in FIG. 1B, the probe $10_k$ is made up of an enclosing tube 11 in which a temperature sensor 12 and a heater 14 are enclosed, the temperature sensor 12 being placed in a neighborhood of a detecting point 15 of the heater 14.

The temperature sensor 12 is made up of a copper-constantan thermocouple and a sheath tube whose tip is closed, where wires 13 of the thermocouple are contained in the sheath tube. A space between the wires 13 and sheath tube is filled with magnesium oxide serving as an insulating material.

A copper and constantan wires are welded together at the detecting point 15. Other ends of the wires 13 are led to a temperature detecting unit 21, and ambient temperature around the detecting point 15 is measured based on a thermo-electromotive force detected at these ends.

In order to detect the liquid level of the pool water 4 in deep part of the liquid holding vessel 1, the wires 13 of the thermocouple need to be extended in length. In this case, however, a large load is placed on the wires 13 of the thermocouple, and thus superior mechanical properties are required of the wires 13 themselves. Furthermore, noise in the detected thermo-electromotive force increases as the wires 13 of the thermocouple get longer, and thus it is necessary to adopt a thermocouple with a large thermo-electromotive force to increase a signal to noise ratio.

The wires 13 of the copper-constantan thermocouple are superior to those of a commonly-used chromel-alumel thermocouple in capability to produce a larger thermo-electromotive force and suitability for low-temperature measurement, but inferior in mechanical properties. Thus, a sheathed copper-constantan thermocouple is adopted as the temperature sensor 12 to ensure mechanical strength.

The sheathed copper-constantan temperature sensor 12 is produced by inserting the wires of the copper-constantan thermocouple into the sheath tube before stretching, and then stretching the wires and sheath tube together. Being contained in the sheath tube, the wires 13 of the copper-constantan thermocouple does not become overloaded, which makes it possible to create the temperature sensor 12 elongated in shape.

The enclosing tube 11 contains the temperature sensor 12 and heater 14. Also, the enclosing tube 11 is filled with magnesium oxide and externally placed in contact with the pool water 4 (liquid phase) and atmosphere (gas phase), where the magnesium oxide has a high heat conductivity. The temperature sensor 12 measures the temperatures of the pool water 4 (liquid phase) and atmosphere (gas phase) via the enclosing tube 11 and magnesium oxide while thermal energy from the heater 14 is released to the pool water 4 (liquid phase) and atmosphere (gas phase) by passing through the magnesium oxide and enclosing tube 11.

A voltage output $V_k$ (k=0 to n) on the order of millivolts is produced from the temperature sensor 12 of the probe $10_k$ configured as described above. Joule heat generated when an electric current is passed through the heater 14 varies in thermal diffusivity depending on whether the detecting point 15 of the probe $10_k$ (k=0 to n) is surrounded by a gas phase or liquid phase. This makes a difference in the voltage output $V_k$ of the temperature sensor 12.

The temperature detecting unit 21 converts the week voltage output $V_k$ received from the probe $10_k$ (k=0 to n) into a temperature signal $V_A(k)$ at a voltage level processible by an analog circuit and outputs the temperature signal to a determination unit 30. Specifically, a voltage range of the voltage output $V_k$ corresponding to a temperature measurement range of 0 to 100 C.° of the probe $10_k$ is converted into the temperature signal $V_A(k)$ corresponding to a voltage range of 1 to 5 V.

A heat supply unit 22 generates Joule heat by activating the heater 14 of a selected probe $10_k$ (k=0 to n) and thereby supplies thermal energy to around the detecting point 15 at a fixed flow rate. Note that a start time and duration t of the heat supply is controlled by the determination unit 30.

Figure 2:
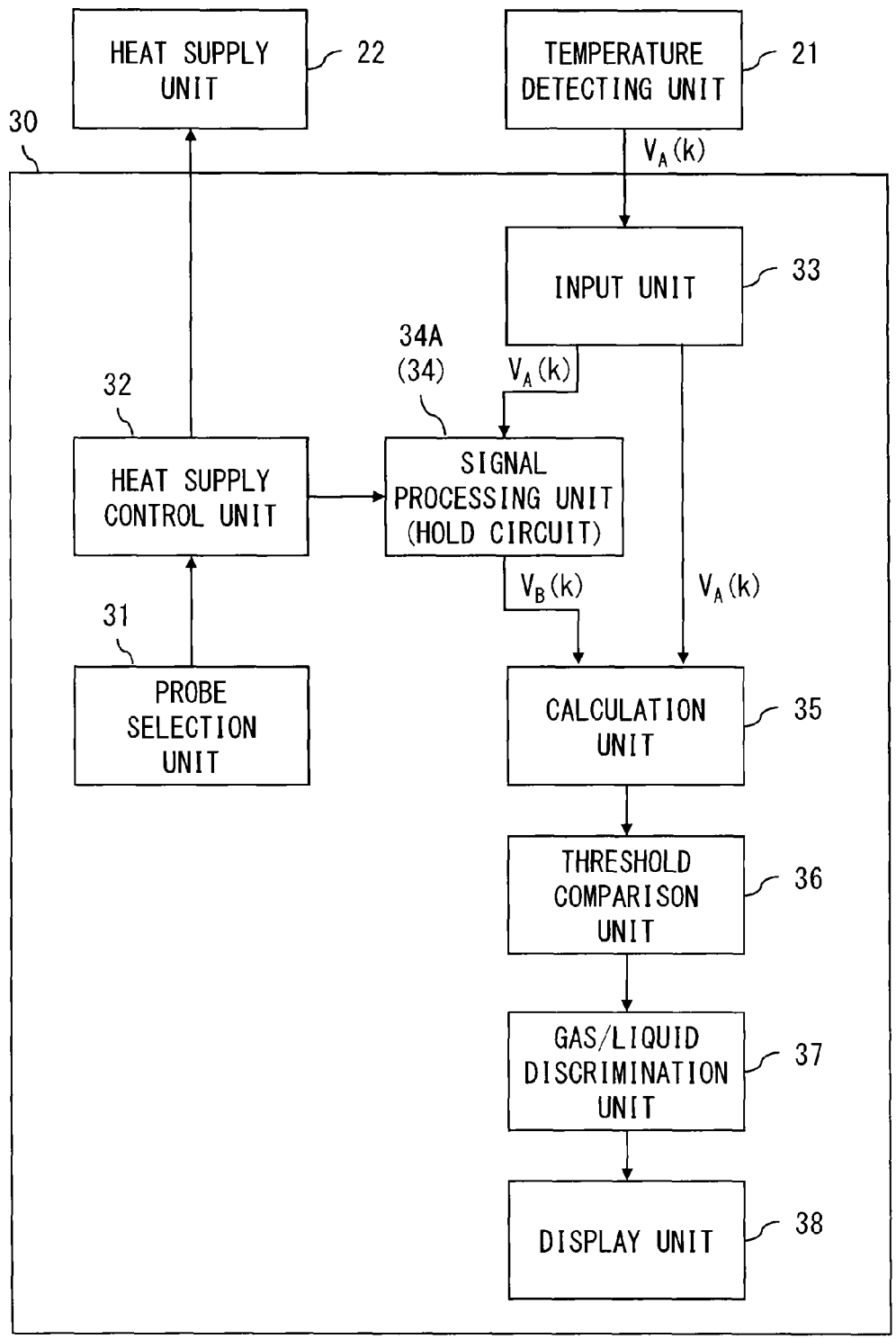
FIG. 2 is a block diagram showing a liquid level sensing apparatus according to a first embodiment.

As shown in FIG. 2 (see also FIG. 1 as appropriate), the determination unit 30 includes a probe selection unit 31 adapted to select a probe 10 whose heater 14 is to be activated from among the plural probes $10_k$ (k=0 to n), an input unit 33 adapted to receive the voltage output $V_k$ of the sensor 12 (FIG. 1) selected by the probe selection unit 31, as the temperature signal $V_A(k)$ directly in the form of an analog quantity, a signal processing unit 34 adapted to output a processing signal $V_B(k)$ of the temperature signal $V_A(k)$ in synchronization with activation of the heater, a calculation unit 35 adapted to arithmetically process the temperature signal $V_A(k)$ and processing signal $V_B(k)$ and output a result, a gas/liquid discrimination unit 37 adapted to discriminate whether the detecting point 15 exists in a gas phase or liquid phase based on the output result of the arithmetic processing, and a display unit 38 adapted to indicate a discrimination result produced by the gas/liquid discrimination unit 37.

The probe selection unit 31 selects a probe 10 to be used for liquid discrimination in the liquid holding vessel 1 from among the plural probes $10_k$ (k=0 to n).

A heat supply control unit 32 causes thermal energy to be supplied to the heater 14 of the selected probe $10_k$ at a fixed flow rate for the duration t and causes the signal processing unit 34 to start processing in synchronization with the start time of the heat supply.

That is, the heat supply control unit 32 outputs a voltage signal to the heat supply unit 22 to activate and deactivate the heater, thereby prescribing the duration t of heat supply, and outputs a same level of a voltage signal to the signal processing unit 34 as well.

The input unit 33 divides the received temperature signal $V_A(k)$ into two parts directly in the form of analog quantity and inputs one part directly to the calculation unit 35 and inputs another part to the signal processing unit 34.

The signal processing unit (hold circuit) 34A accepts as input a synchronizing signal from the heat supply control unit 32, and outputs the processing signal $V_B(k)$ held at a level of the temperature signal $V_A(k)$ at the time of input.

That is, when the synchronizing signal from the heat supply control unit 32 is set to OFF, the signal processing unit 34A outputs the received temperature signal $V_A(k)$ as it is. Then, when the synchronizing signal is switched to ON, the signal processing unit 34A continues to output the held processing signal $V_B(k)$ by maintaining an input voltage level of the temperature signal $V_A(k)$ inputted at that time until the synchronizing signal is switched to OFF again.

The signal processing unit 34A is comprised, for example, of a hold circuit and the like, the hold circuit being made up of a combination of a switch contact and capacitor.

Figure 3:
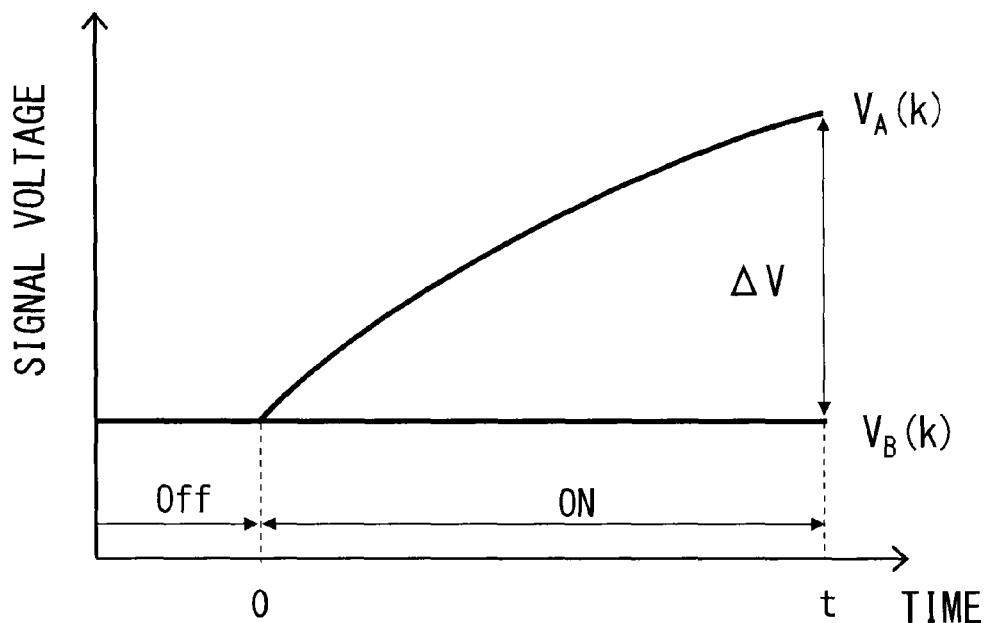
FIG. 3 is a graph showing time variations of a temperature signal $V_A$ and processing signal $V_B$ when the liquid level sensing apparatus according to the first embodiment makes a decision of a gas phase.

A graph in FIG. 3 shows time variations of the temperature signal $V_A$ and the processing signal $V_B$ thereof when the detecting point 15 of the probe $10_k$ is exposed to a gas phase and the synchronizing signal of the heat supply control unit 32 is switched from an OFF setting to an ON setting.

When a tip of the probe $10_k$ is exposed to a gas phase in this way, the thermal energy supplied from the heater 14 does not diffuse in the gas phase with low thermal diffusivity and thus greatly raises the ambient temperature around the detecting point 15.

Consequently, the temperature signal $V_A(k)$ of the temperature sensor 12 increases with a time constant on the order of a few minutes and greatly diverges from the processing signal $V_B$ held at the level of the temperature signal $V_A(k)$ at the time of switching to ON.

Figure 4:
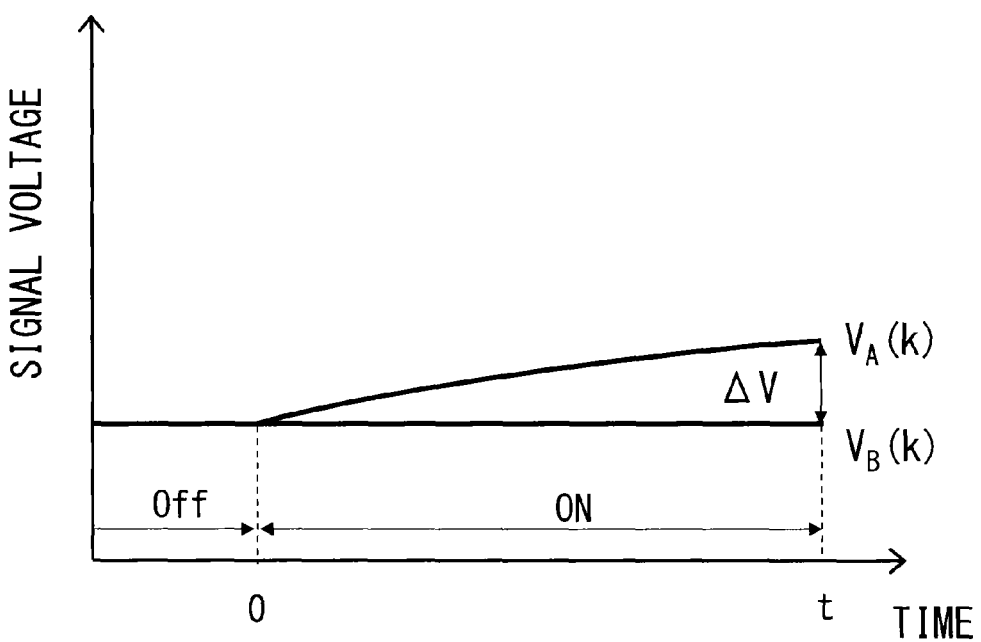
FIG. 4 is a graph showing time variations of a temperature signal $V_A$ and processing signal $V_B$ when the liquid level sensing apparatus according to the first embodiment makes a decision of a liquid phase.

Next, a graph in FIG. 4 shows time variations of the temperature signal $V_A$ and the processing signal $V_V$ thereof when the detecting point 15 of the probe $10_k$ is immersed in a liquid phase and the synchronizing signal of the heat supply control unit 32 is switched from an OFF setting to an ON setting.

When the tip of the probe $10_k$ is immersed in a liquid phase in this way, the thermal energy supplied from the heater 14 is diffused in the liquid phase with high thermal diffusivity, and thus the ambient temperature around the detecting point 15 does not rise much.

Consequently, the temperature signal $V_A(k)$ of the temperature sensor 12 reaches a state of equilibrium without diverging much from the processing signal $V_B$ held at the level of the temperature signal $V_A(k)$ at the time of switching to ON.

The calculation unit 35 (FIG. 2) applies a subtraction process to the temperature signal $V_A(k)$ and processing signal $V_B(k)$ thereof, and outputs a difference to a threshold comparison unit 36.

During the duration t of heat supply, the threshold comparison unit 36 outputs a determination signal to the gas/liquid discrimination unit 37, indicating whether or not a relationship between the output of the calculation unit 35 and a threshold α satisfies determination formula (1) below. As the threshold α, an optimal value is established experimentally.

$$\alpha < V_A(k) - V_B(k) \tag{1}$$

When determination formula (1) is satisfied, the gas/liquid discrimination unit 37 determines that the tip of the probe $10_k$ is exposed to a gas phase and when determination formula (1) is not satisfied, the gas/liquid discrimination unit 37 determines that the tip of the probe $10_k$ is immersed in a liquid phase.

The display unit 38 is designed to present a discrimination result to an operator, indicating whether the tip portion of the probe $10_k$ is in a liquid phase or gas phase and is implemented, for example, by a function to turn on and off a lamp.

As another operation example, the calculation unit 35 (FIG. 2) applies a division process to the temperature signal $V_A(k)$ and processing signal $V_B(k)$ thereof, and outputs a quotient to the threshold comparison unit 36.

During the duration t of heat supply, the threshold comparison unit 36 outputs a determination signal to the gas/liquid discrimination unit 37, indicating whether or not a relationship between the output of the calculation unit 35 and a threshold β satisfies determination formula (2) below. As the threshold β, an optimal value is established experimentally.

$$\beta < V_A(k)/V_B(k) \tag{2}$$

When determination formula (2) is satisfied, the gas/liquid discrimination unit 37 determines that the tip of the probe $10_k$ is exposed to a gas phase and when determination formula (2) is not satisfied, the gas/liquid discrimination unit 37 determines that the tip of the probe $10_k$ is immersed in a liquid phase.

Second Embodiment

Figure 5:
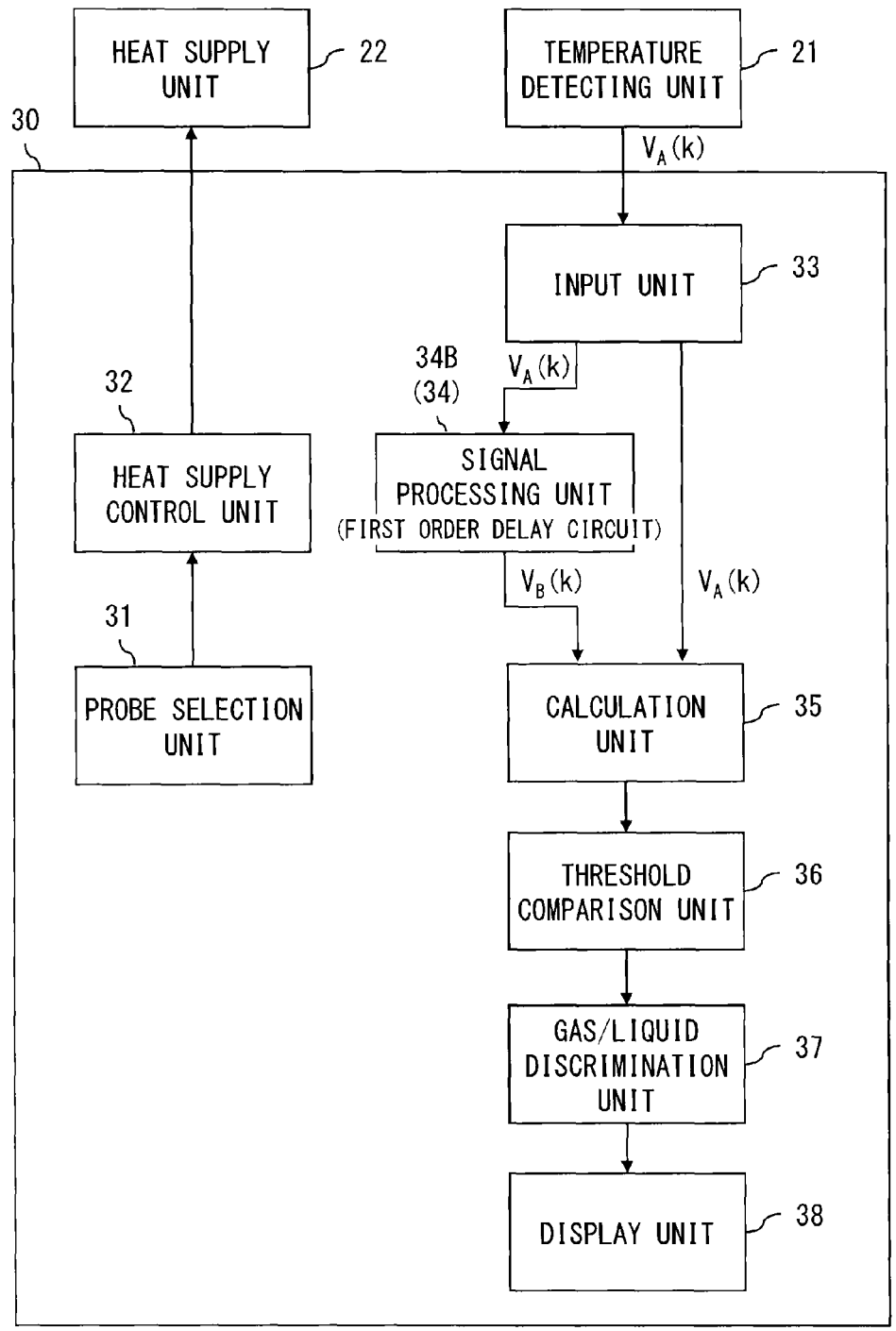
FIG. 5 is a block diagram showing a liquid level sensing apparatus according to a second embodiment.

Referring now to FIG. 5, a second embodiment of the present invention will be described.

The second embodiment differs from the first embodiment in that a signal processing unit 34B (34) of the determination unit 30 is a first order delay circuit adapted to output a first order delay response to a temperature signal. In FIG. 5, components same as or equivalent to those in FIG. 2 are denoted by the same reference numerals as the corresponding components in FIG. 2, and redundant description thereof will be omitted.

In this way, since the signal processing unit 34B is configured as a first order delay circuit, a processing signal $V_B(k)$ for use in gas/liquid discrimination can be outputted to the calculation unit 35 in synchronization with heat supply without the need for a synchronizing signal from the heat supply control unit 32.

Also, such a first order delay circuit can be implemented solely by a resistor and capacitor, eliminating the need for the threshold comparison unit 36 to recognize the start time of the duration t of heat supply and thereby allowing a determination to be made based on determination formula (1) or (2) described above without regard to time.

Thus, the second embodiment allows configuration of the determination unit 30 to be simplified.

Figure 6:
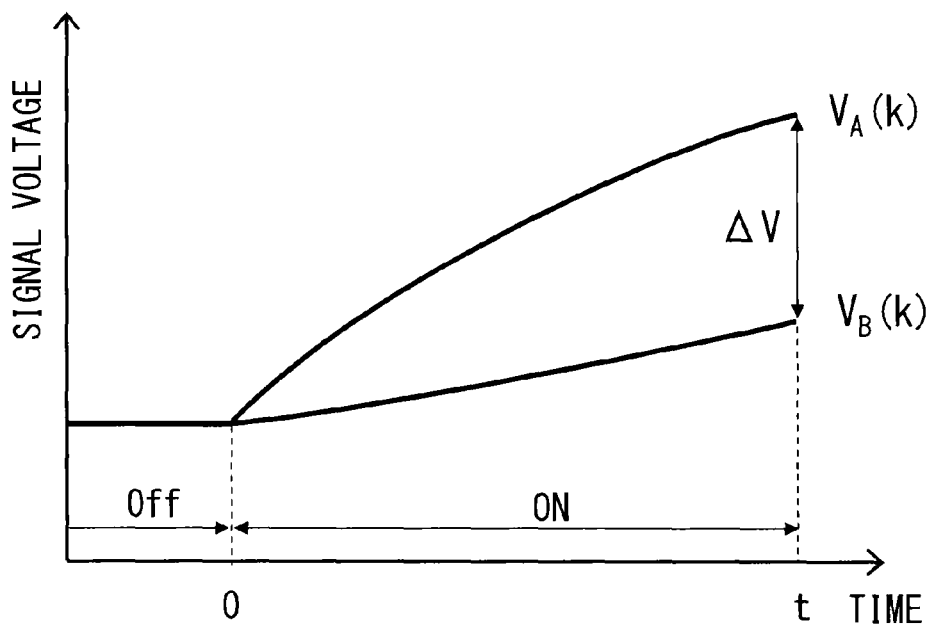
FIG. 6 is a graph showing time variations of a temperature signal $V_A$ and processing signal $V_B$ when the liquid level sensing apparatus according to the second embodiment makes a decision of a gas phase.

A graph in FIG. 6 shows time variations of the temperature signal $V_A$ and the processing signal $V_B$ thereof when the detecting point 15 of the probe $10_k$ according to the second embodiment is exposed to a gas phase and the heat supply control unit 32 is switched from an OFF setting to an ON setting.

During a period when the heat supply control unit 32 is at an OFF setting, since the temperature signal $V_A(k)$ is in a steady state, the processing signal $V_B$ converges to the temperature signal $V_A(k)$.

However, when the heat supply control unit 32 is switched to an ON setting, the temperature signal $V_A(k)$ from the gas phase rises greatly and shifts to a transient state. Then, the processing signal $V_B(k)$ which indicates a first order delay response to the transient state increases, following the temperature signal $V_A(k)$, but diverges greatly, being unable to keep up with a rate of change of the temperature signal $V_A(k)$.

Figure 7:
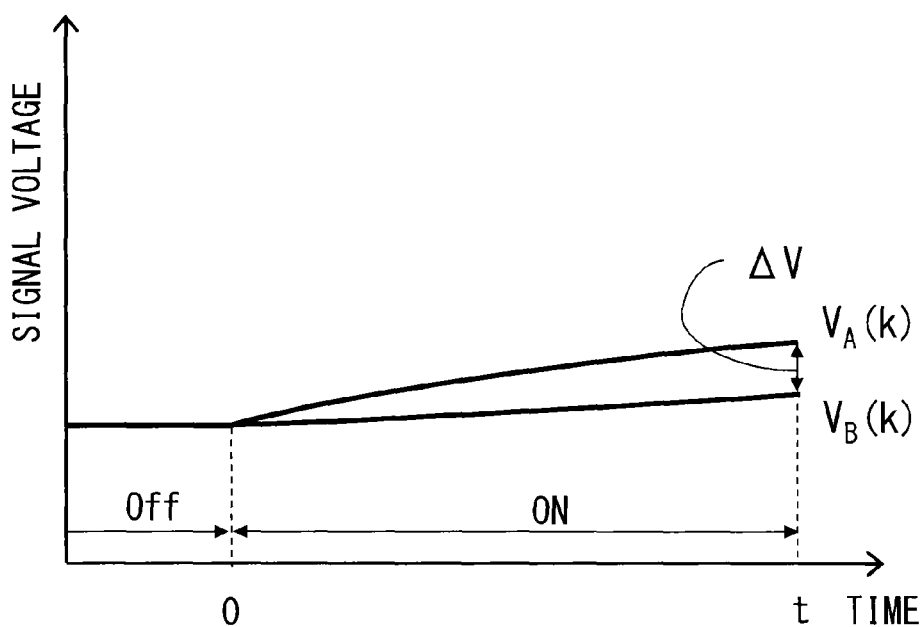
FIG. 7 is a graph showing time variations of a temperature signal $V_A$ and processing signal $V_B$ when the liquid level sensing apparatus according to the second embodiment makes a decision of a liquid phase.

Next, a graph in FIG. 7 shows time variations of the temperature signal $V_A$ and the processing signal $V_B$ thereof when the detecting point 15 of the probe $10_k$ according to the second embodiment is immersed in a liquid phase and the heat supply control unit 32 is switched from an OFF setting to an ON setting.

During a period when the heat supply control unit 32 is at an OFF setting, since the temperature signal $V_A(k)$ is in a steady state, the processing signal $V_B$ converges to the temperature signal $V_A(k)$.

Then, when the heat supply control unit 32 is switched to an ON setting, the temperature signal $V_A(k)$ from the liquid phase rises and shifts to a transient state, but has a low rate of change. Consequently, the processing signal $V_B(k)$ which indicates a first order delay response to the transient state increases, following the temperature signal $V_A(k)$ with a small divergence. A time constant of the first order delay is, for example, around 60 seconds.

Figure 8:
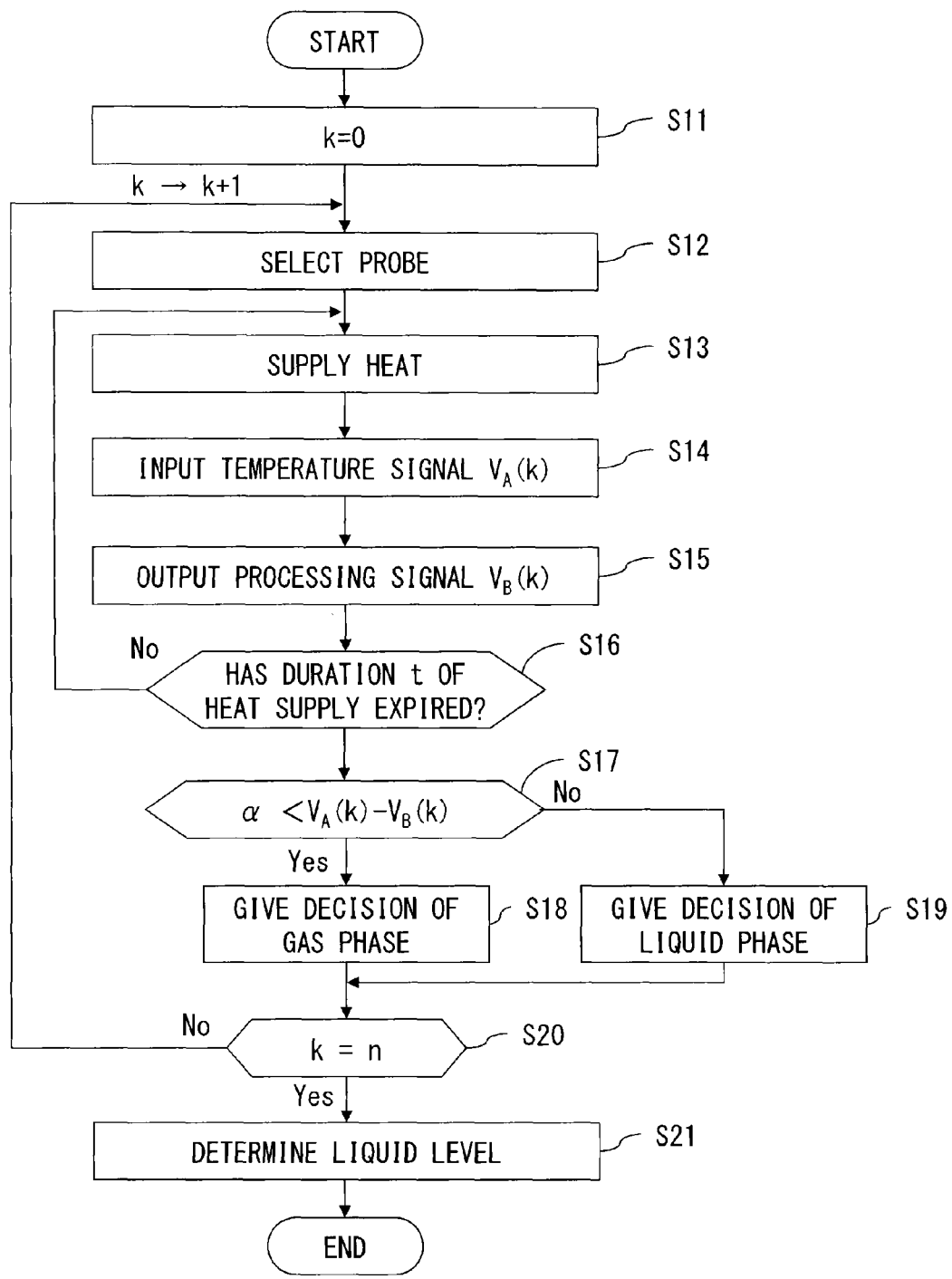
FIG. 8 is a flowchart showing operation of the liquid level sensing apparatus according to the above embodiments.

Operation of the liquid level sensing apparatus according to the above embodiments will be described with reference to a flowchart of FIG. 8 (also to FIG. 1 as appropriate).

Plural probes $10_k$ (k=0 to n) placed by varying their tip position in a height direction of the liquid holding vessel 1 are selected one at a time beginning at the top (S11 and S12). Then, heat supply to the heater 14 is started by inputting the output $V_k$ from the temperature sensor 12 of the selected probe $10_k$ as the temperature signal $V_A(k)$ directly in the form of an analog quantity (S13 and S14).

The processing signal $V_B(k)$ (hold value or first order delay response) of the temperature signal $V_A(k)$ is outputted in synchronization with the heat supply (S15), and the temperature signal $V_A(k)$ and processing signal $V_B(k)$ thereof are arithmetically processed and results are outputted until the duration t of heat supply expires (No or Yes in S16).

If the output result of the arithmetic processing satisfies determination formula (1) or (2) described above, a decision of a gas phase is made (Yes in S17; S18), and if the output result does not satisfy determination formula (1) or (2), a decision of a liquid phase is made (No in S17; S19).

Furthermore, a determination as to a gas phase or liquid phase is made using a next probe $10_k$ (No in S20), and the liquid level in the liquid holding vessel 1 is determined based on determination results produced using all the probes $10_k$ (k=0 to n) (Yes in S20; S21).

The liquid level sensing apparatus according to at least one of the embodiments described above can be made up solely of analog circuit, providing robustness against contingencies in nuclear facilities.

Whereas a few embodiments of the present invention have been described, these embodiments are presented only by way of example, and not intended to limit the scope of the invention. These embodiments can be implemented in various other forms, and various omissions, replacements, changes, and combinations can be made without departing from the spirit of the invention. Such embodiments and modifications thereof are included in the spirit and scope of the invention as well as in the invention set forth in the appended claims and the scope of equivalents thereof.

For example, although the liquid level is sensed by the plural probes $10_k$ (k=0 to n) mounted at fixed locations in the above embodiments, the liquid level may be sensed by moving the probes in a vertical direction.

The invention claimed is:

1. A liquid level sensing apparatus which measures a liquid level in a liquid holding vessel based on temperature signals from a plurality of probes placed at fixed intervals in a vertical direction of the liquid holding vessel, wherein each of the probes includes a temperature sensor and a heater enclosed in the probe and the heater is placed in a neighborhood of a detecting point of the temperature sensor, the liquid level sensing apparatus comprising:
   a probe selection unit configured to select a probe whose heater is to be activated from among the plurality of probes;
   an input unit configured to receive an output of the temperature sensor of the probe selected by the probe selection unit, the output being received as a temperature signal directly in a form of an analog quantity;
   a signal processing unit configured to output a processing signal of the temperature signal in synchronization with activation of the heater;
   a calculation unit configured to arithmetically process the temperature signal and the processing signal and output a result;
   a gas/liquid discrimination unit configured to discriminate whether the detecting point exists in a gas phase or a liquid phase based on the output result of the arithmetic processing; and
   a display unit configured to indicate a discrimination result produced by the gas/liquid discrimination unit,
   wherein the calculation unit finds one of a difference and a quotient between the temperature signal and the processing signal and outputs a result, and
   the signal processing unit is one of a hold circuit and a first order delay circuit, wherein the hold circuit holds the processing signal at a level of the temperature signal at a start time of the heat supply and the first order delay circuit outputs a first order delay response to the temperature signal.

2. The liquid level sensing apparatus according to claim 1, further comprising a liquid level determination unit configured to determine the liquid level based on the discrimination result produced by the gas/liquid discrimination unit.

3. A liquid level sensing method for measuring a liquid level in a liquid holding vessel based on temperature signals from a plurality of probes placed at fixed intervals in a vertical direction of the liquid holding vessel, wherein each of the probes includes a temperature sensor and a heater enclosed in the probe and the heater is placed in a neighborhood of a detecting point of the temperature sensor, the liquid level sensing method comprising:
   selecting a probe whose heater is to be activated from among the plurality of probes;
   receiving an output of the temperature sensor of the selected probe as a temperature signal directly in a form of an analog quantity;
   outputting a processing signal of the temperature signal in synchronization with activation of the heater;
   arithmetically processing the temperature signal and the processing signal and outputting a result;
   discriminating whether the detecting point exists in a gas phase or a liquid phase based on the output result of the arithmetic processing; and
   displaying a discrimination result based on at least one of the selected probes,
   wherein the arithmetically processing finds one of a difference and a quotient between the temperature signal and the processing signal and outputs a result, and the outputting a processing signal utilizes one of a hold circuit and a first order delay circuit, wherein the hold circuit holds the processing signal at a level of the temperature signal at a start time of the heat supply and the first order delay circuit outputs a first order delay response to the temperature signal.

\* \* \* \* \*